Figure 1:
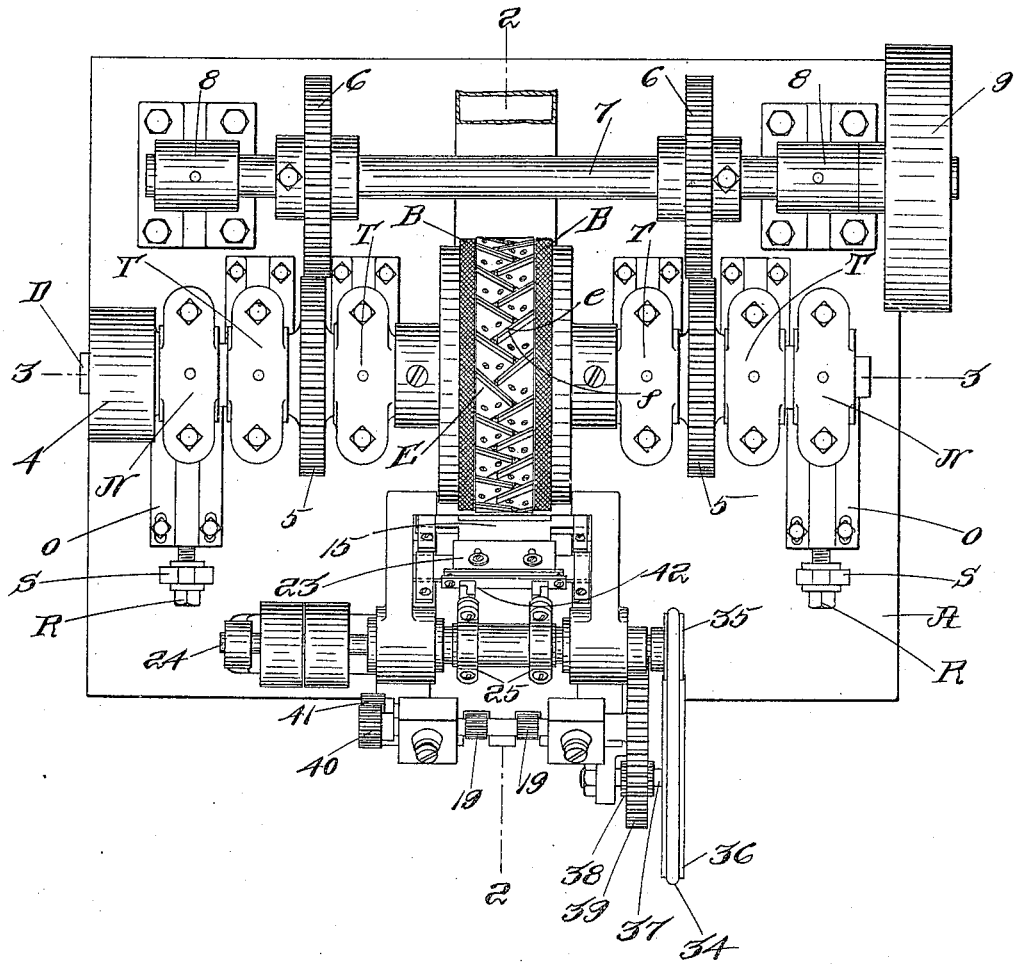

W. W. TAINTER & G. P. STANLEY.
TOOTHPICK MACHINE.
APPLICATION FILED AUG. 20, 1909.

953,360.

Patented Mar. 29, 1910.

3 SHEETS—SHEET 1.

W. W. TAINTER & G. P. STANLEY.
TOOTHPICK MACHINE.
APPLICATION FILED AUG. 20, 1909.

953,360.

Patented Mar. 29, 1910.
3 SHEETS—SHEET 3.

Witnesses:
John H. Parker
R. Wallace

Inventors
Willis W. Tainter
George P. Stanley
by MacLeod Calver Copeland & Dike
Attorneys

UNITED STATES PATENT OFFICE.

WILLIS W. TAINTER AND GEORGE P. STANLEY, OF DIXFIELD, MAINE.

TOOTHPICK-MACHINE.

953,360. Specification of Letters Patent. Patented Mar. 29, 1910.

Application filed August 20, 1909. Serial No. 513,847.

*To all whom it may concern:*

Be it known that we, WILLIS W. TAINTER and GEORGE P. STANLEY, citizens of the United States, residing at Dixfield, in the county of Oxford and State of Maine, have invented a certain new and useful Improvement in Toothpick-Machines, of which the following is a specification, reference being had therein to the accompanying drawings.

In the manufacture of fine wood toothpicks which are pointed it is necessary that the tooth-pick blank be pointed and polished after it has been cut from the sheet of veneer from which it is made. The tooth-pick blank is usually square in cross-section and if the picks are to be double pointed the blanks are cut substantially pyramidal in shape at each end. The finishing of the tooth-pick is usually for the purpose of rendering the finished article substantially circular in cross-section and conical in shape at the ends.

The object of the present invention is to provide a finishing machine so constructed and connected with the blank-cutting machine that the blanks will feed directly from the blank-cutting machine to the finishing machine without the interposition of special intermediate blank feed mechanism.

In the form of machine illustrated in the drawings as embodying the invention, the blank-cutting mechanism is similar to that shown in Patent No. 854,116, dated May 21, 1907, to Stanley and Tainter, except, however, the mechanism is mounted in such manner that the veneer blank will be fed along an upwardly inclined way instead of on a horizontal table as shown in said patent, and the cutter-dies stand also at an inclination at right angles to the inclined table, so that the sluice-way between the dies through which the blanks pass to the cutting wheel of the finishing mechanism will be at a greater angle to the periphery of the cutting wheel than if the dies were in a vertical position and tangential to the cutting wheel.

The finishing mechanism is in general somewhat like that shown in Patent No. 848,406 to Tainter and Stanley, dated March 26, 1907, but differing therefrom in some important features. In the device of that patent there were three rotating cutting members and two fixed concave abrading members, the tooth-pick blanks passing between the rotating members and the fixed members, the three rotating cutting members being adjusted so that their surfaces are substantially in line with each other, the middle rotating member rotating at different speed from the two end rotating members and the fixed abrading members being spaced apart equal to the width of the middle rotating member so that the ends of the blank are supported by the two fixed members, the tooth-pick being caused to revolve upon its axis as it slides along on the concave fixed abrading members by reason of the differential speeds of the rotating members, the middle rotating member being operative upon the middle portion of the pick which is of the greater diameter, and the two end rotating cutting members serving to finish the pointed ends of the blank. In that form of machine the blanks were cut to exactly the length desired for the finished pick and the three rotating members were all employed to form different portions of the finished pick, that is the two side rotating members formed the pointed ends of the pick.

In the machine of the present invention the middle rotating member is of sufficient width and form to finish the pick throughout its entire length, the two outside rotating wheels being only for feeding the blanks, the blanks being cut to a length slightly in excess of the finished pick, the two fixed concave members being spaced apart a distance equal to the width of the middle rotating cutting member so that the excess portion of the blanks at each end will be supported upon the fixed concave members, and the two outside rotating members which coöperate with the fixed concave members, will engage the excess end portions of the blanks, the said fixed concave members serving as ways and the two end rotating members thus serving as feeds for the tooth-pick blanks while the body portion is being finished by the middle cutting wheel and when the blank has passed through the cutting mechanism there will be left on each end a knob which forms the two supporting portions of the blank. These knobs will be subsequently removed as the picks pass through the tumbling mechanism.

The invention will be fully understood from the following description taken in connection with the accompanying drawings, and the novel features are pointed out and clearly defined in the claims at the close of the specification.

Figure 2:
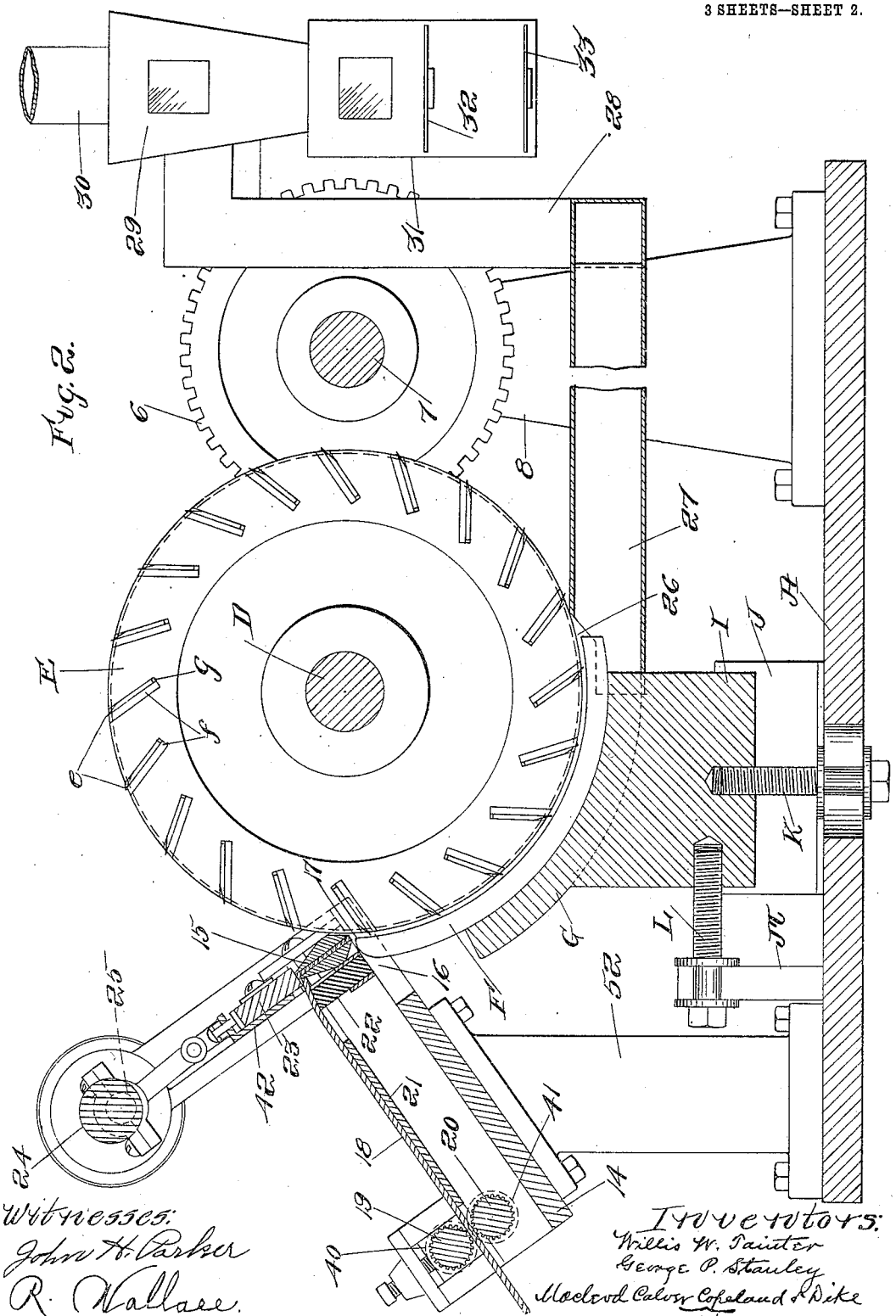
Figures 3, 4, 5:
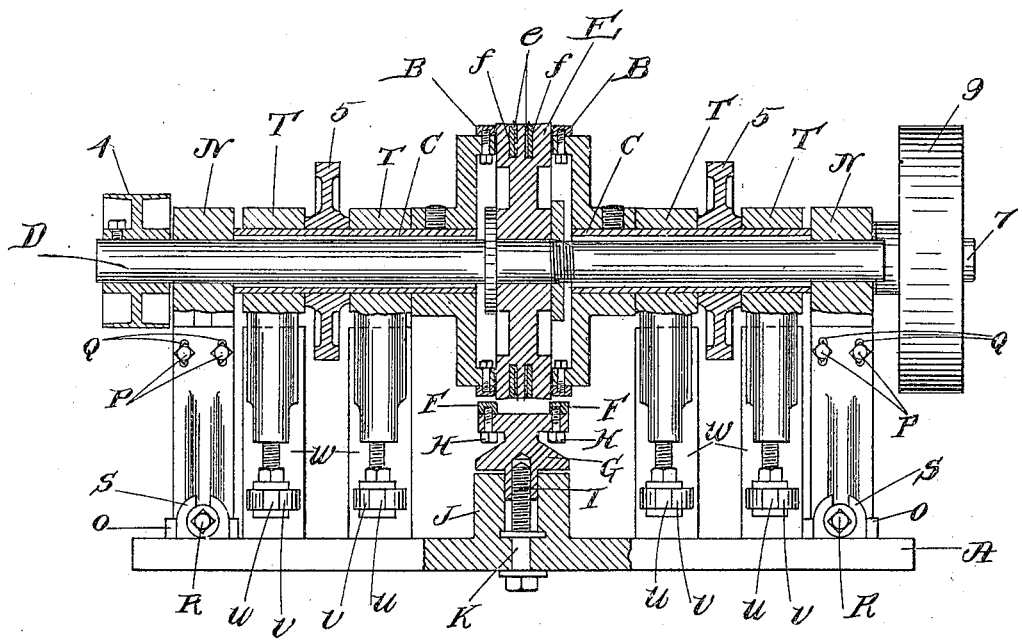

In the drawings,—Figure 1 is a plan, partly in section, of a machine embodying the invention. Fig. 2 is a vertical section on line 2—2 of Fig. 1 on an enlarged scale. Fig. 3 is a section on line 3—3 of Fig. 1. Fig. 4 is a detail view showing a blank as it appears in its passage through the finishing mechanism. Fig. 5 is a detail view of the blank after it has passed through the finishing mechanism, showing the knobs left on the ends of the finished blanks, before they are transferred to the tumbling mechanism.

Referring to the drawings,—A indicates a base-plate upon which the various parts of the machine are supported. The rotating feed members comprise a pair of roughened wheels B, B, each mounted on a sleeve C which is somewhat larger than the shaft D upon which is mounted a third or intermediate rotating wheel E in the periphery of which are inserted the cutters e. The form and construction of the cutters and the manner in which they are mounted in the periphery of the wheel E will form the subject-matter of another application filed by us, August 20, 1909, Serial No. 513,846. For convenience of designation, the wheel E and the cutters mounted therein will in the specification be referred to collectively as the intermediate wheel or cutting member. The rotating feed members B, B, coöperate with a fixed concave shoe which extends about a portion of the circumference of the said rotating cutting members and is provided with a pair of fixed files or roughened ways F, F, attached to a holder G by cap-screws H.

In order that the holder G and the files F thereon may be adjusted with relation to the rotating members a lug I is formed thereon, this lug I being adapted to move in the ways J fast to the frame of the machine. Vertical movement is given to the holder G by means of a bolt K. A horizontal adjustment for the holder is similarly provided by means of the bolt L engaging the lug M fast to the base-plate A of the machine.

The shaft D, upon which the intermediate rotating cutting wheel E is located, is mounted in adjustable bearings comprising boxes N and base pieces O, O, vertical adjustment for these being provided by means of the cap-screws P and slots Q. The said bearings for the shaft D are also adjustable horizontally on the bed-plate A by means of the adjusting screws R, R, engaging the lugs S on the base of the machine.

The sleeve C, upon which the rotating feed members B are mounted, has an interior diameter somewhat greater than the diameter of the shaft D, so that the shaft D and the said sleeve C may be adjusted slightly with relation to each other to compensate for the different wear of the members and for other purposes. To assist in obtaining this adjustment, sleeve C is mounted in bearings T which are adjustable vertically by means of adjusting screws U, U, engaging the lugs V, V, formed on the sides of the posts W which are attached to the base-plate A of the machine by the cap-screws.

The main shaft D is driven by a belt on the pulley 4. Each of the sleeves C is provided with a gear 5 located between the bearings T, T, said gears 5 meshing with a pair of gears 6, 6, located on counter-shaft 7 which is supported at the back of the machine in bearings 8. This counter-shaft is driven by a belt on pulley 9. The shaft D and the intermediate cutting wheel E thereon are driven at a high rate of speed, for example five thousand revolutions per minute, while the sleeve C and the exterior rotary or feed members B, B, are driven at a relatively slow rate of speed, as for example one hundred revolutions per minute. The surface of the cutting wheel E is made very slightly concave to conform somewhat to the shape of the tooth-pick which it is desired to make. The rotary feed members B, B, are adjusted so that their peripheries will be spaced from the fixed concaves F, F, nearly equal to the full thickness of the blank so that while sufficiently close as to grip the end portions enough to feed the blank, the said gripped end portions will not be trimmed or ground smaller as the finished tooth-pick portion is trimmed, but will leave knobs 50 at the ends as shown in Figs. 4 and 5. These knobs are the excess portions of the blank and will be easily removed during the tumbling operation after they leave the finishing machine, leaving only the double pointed intermediate portion 51 for the finished tooth-pick.

The different circumferential speeds given to the exterior rotating members B, B, as compared with the intermediate rotating member E cause the tooth-pick blank to rotate rapidly on its own axis as it passes between the rotary and fixed abrading members, so that the cutting knives e will act uniformly upon the entire circumference of the body portion 51 of the blank as the tooth pick revolves. The cutters e are set into the periphery of the wheel E, the cutting edges extending from the outer edge of the wheel in a somewhat diagonal direction of the periphery instead of straight across and extending for somewhat more than half the distance across the face of the periphery. Some of the cutters are set in from one edge of the wheel and others from the other edge, alternating with each other, giving a zig-zag or staggered appearance as shown in Fig. 1, so that the wheel E will have a cutting surface throughout the entire width of the wheel. Each cutter blade is preferably adjustably attached to a chip or holder plate *f* in front of the blade, and the combined blade and chip are adjustably secured in a slot *g* in the periphery of the wheel. The outer edge of the chip is curved to conform to the curvature of the periphery of the wheel E and the cutter blade is also curved and adjusted to project slightly above the periphery of the wheel and chip. This construction of cutting wheel forms the subject of another application, Serial No. 513,846 hereinbefore mentioned. The width of the wheel E is equal to the length of the finished pick, the blank being of sufficient excess length, so that its ends may be engaged by the feed members B, B.

A table 14 is mounted in front of the finishing mechanism upon a supporting column 52, preferably at an angle of about 45 degrees. Mounted in the forward part of the table 14 is a cutting die 15 which is formed in two parts so shaped that when they are secured together a central opening or space will be formed corresponding in shape to the shape of the blank which is to be cut from the veneer. The forward end of the table 14, upon which the die 15 rests, is slotted beneath the die for the greater part of the length of the die, the die bridging across the opening 16 in the table, the bottom of the die near each end resting upon the table at each end of the opening so that the blanks, as they are forced out of the opening in the bottom of the die, will drop through the entrance 17 into the space between the fixed concave members F and the cutting wheel E and feed wheels B, B. The veneer strip 18 is fed from a roll (not shown) between feed rolls 19, 20, over the top of the cutting die 15. The toothed feed rolls 19 and 20 are actuated by means of a belt 34 which passes over a pulley 35 on the main shaft 24 and also over the pulley 36 which is journaled on a stud 37. The hub of the pulley 36 has secured thereto a pinion 38 which meshes with the gear 39 fast to the end of the shaft on which the upper feed rolls 19 are mounted. The shaft on which the lower feed rolls 20 are mounted is driven by gears 40 on the upper feed roll shaft meshing with the gear 41 on the lower feed roll shaft. The block 23 is adjustably mounted in a holder 42.

Preferably the veneer, after it passes from the feed-rolls 19, 20, passes over a spring-plate 21 and thence over a rubber block 22 which normally keeps the veneer slightly above the level of the top of the cutter-die so that as the veneer is fed forward, it will be fed forward slightly above the top of the cutter-die, so as not to interfere with the die. The veneer is forced down upon the cutter-die by the reciprocating block 23, thus causing the forward end of the unsevered portion of the veneer back of the cutter-die to bend down slightly as shown in Fig. 2. When the reciprocable block 23 moves up again, the resiliency of the rubber block 22 and of the spring 21 will cause the free end of the veneer to rise again, so that at the next feed it will be fed forward above the die. The cutting block 23 is actuated from the shaft 24 by an eccentric 25 and suitable connections. The passage through the die is no greater than the width of the blank cut from the veneer so that the friction of the blanks on the sides of the passage will prevent them from falling by gravity alone but only as they are forced down by the pressure of those above. Consequently none of the blanks will drop out of the die until the chamber in the die is full and then the pressure from above will force the bottom blank out into the entrance 17 to the finishing wheel. As the blanks are forced through the bottom of the opening in the die into the entrance 17 to the finishing mechanism, they will all fall in true position with the ends resting upon the fixed concave F, F, and at the same time be gripped by the rotating members B, B, which are set near enough to the fixed concaves F, F, so that the blanks will have contact both with the rotating members B, B, and the fixed members F, F, sufficiently to be kept in true position and fed along as the wheels rotate and at the same time the blanks will be rotated on their axes, thus presenting all parts of the intermediate portion of the blanks to the abrading action of the intermediate cutting wheel E.

After the blanks pass out through the exit 26 at the lower end of the fixed abrading members F, F, they drop into the chute 27 and are drawn up through the rising portion 28 of the chute into a hopper 29 by means of suction through a suction-pipe 30 and thence fall down through the hopper into the box 31 in which are trays 32, 33, to receive the picks. The upward suction through the pipe 30 will carry off all of the fine splinters but as the sectional area of the hopper 29 is much larger than the sectional area of the pipe 28 the upward suction is not sufficient to overcome the weight of the blanks after they are carried into the hopper, therefore the blanks will fall down through the hopper. The trays 32, 33, are arranged so that when the tray 32 is filled the tray 32 may be removed and the picks will fall onto tray 33, and when tray 33 is filled, tray 32 is inserted and 33 is removed.

In employing our machine herein described, the blanks are cut as will be clear from the green veneer and passed directly into the finishing machine as above set forth before drying and are then after leaving the finishing machine, dried and "hustled" to complete the finishing operation. Thereby the handling of the green blank to dry it before finishing is avoided.

What we claim is:

1. In a machine for making tooth picks, a cutting die having a passage therethrough for the passage of the blanks after they are cut, said die being mounted in such manner that the passage way will be at an inclined angle to the vertical, a concave located beneath the outlet from the cutting die, a rotary feed wheel coöperating with said concave and adapted to engage and feed the blanks to cause them to ride down said concave and a rotary cutting wheel adapted to engage and shape said blank in its passage along said concave.

2. In a machine for making tooth picks, a cutting die having a passage therethrough for the passage of the blanks after they are cut, said die being mounted in such manner that the passage way will be at an inclined angle to the vertical, an inclined table over which the veneer is fed across the top of the cutting die at right angles to the passage through said die, a plunger which is adapted to coöperate with said die to sever the blanks from the strip, a fixed concave located beneath the outlet from the cutting die, and a rotary cutting wheel adapted to engage the blank as it passes down the concave.

3. In a machine for making tooth-picks, blank-forming mechanism adapted to form blanks of a somewhat greater length than the finished tooth-picks, finishing mechanism comprising two fixed concave surfaces spaced apart from each other and forming ways on which the excess end portions of the blanks are supported while they pass through the finishing mechanism, two rotary feed wheels spaced apart from each other which coöperate with said fixed concave surfaces and engage the excess end portions of the blanks between the peripheries of the feed wheels and the fixed concave ways, thereby causing the blanks to travel over said concave ways and to rotate on their axes during the travel and a rotary cutting wheel between said feed-wheels which engage said blanks throughout the intermediate portions between the excess ends.

4. In a machine for making tooth-picks, blank-cutting mechanism adapted to form blanks of a somewhat greater length than the finished tooth-picks, tooth-pick finishing mechanism having a rotary cutting wheel whose periphery is concaved in cross-section to correspond to the form of the finished tooth-pick and of a width substantially equal to the length of the finished tooth-pick, a rotary feed-wheel on each side of the cutting wheel adjacent thereto, means for rotating said feed-wheel and cutting wheels, two fixed concave surfaces coöperating with the rotary feed-wheels and spaced therefrom a distance substantially equal to the diameter of the tooth-pick blanks, said concaves being located beneath the outlet from the blank-cutting mechanism, whereby the blanks as they leave the blank-cutting mechanism will pass broadside into the opening between the fixed concaves and the rotary wheels, the excess ends of the blanks being engaged by the feed-wheels and the fixed concaves.

5. In a machine for making tooth picks, a cutting die having a passage therethrough for the passage of the blanks after they are cut, said die being mounted in such manner that the passage way will be at an inclined angle to the vertical, an inclined way located below the outlet from the cutting die onto which the blanks fall as they pass from the outlet of the cutting die, and cutting mechanism which engages the blanks and shapes them as they pass down the inclined guide.

6. In a machine for making tooth-picks, blank-cutting mechanism adapted to form blanks of a somewhat greater length than the finished tooth-picks, tooth-pick finishing mechanism comprising a rotary cutting wheel whose periphery is concaved in cross-section to correspond to the form of the finished tooth-pick and of a width substantially equal to the length of the finished tooth-pick, a rotary feed-wheel on each side of the cutting wheel adjacent thereto, means for rotating said cutting wheel, means for rotating said feed-wheels at a different rate of speed than that of the cutting wheel, two fixed concave surfaces coöperating with the rotary feed-wheels and spaced therefrom a distance substantially equal to the diameter of the tooth-pick blanks, said concaves being located beneath the outlet from the blank-cutting mechanism whereby the blanks as they leave the blank-cutting mechanism will be forced broad-side into the opening between the fixed concaves and the rotary feed-wheels, the excess ends of the blank being engaged by the feed-wheels and the fixed concaves whereby the friction of the rotary feed-wheels will cause the blanks to be carried through the concave passageway and the body of the tooth-pick will be subjected to the abrading action of the cutting wheel.

7. In a machine for making tooth-picks, a cutting-die having a passage therethrough for the passage of the blanks after they are cut, said die being mounted in such manner that the passageway will be at an inclined angle to the vertical, said die being adapted to cut a blank of a length somewhat in excess of the finished tooth-pick, means for feeding a blank-strip to said cutter-die, a fixed concave located beneath the outlet from the cutting-die, said concave having two surfaces spaced apart on which the excess end portions of the blank will ride as the blank falls from the die, a rotary cutting wheel having a cutting surface of a width equal to the length of the finished tooth-pick, a rotary feed-wheel on each side of the cutting wheel adjacent thereto whose peripheries are adapted to engage the excess ends of the blank as it rides down upon the fixed concaves, the cutting wheel being adapted to engage the intermediate portion of the blank.

8. In a machine for making tooth picks, a cutting die having a passage therethrough for the passage of the blanks after they are cut, an inclined way located below the outlet from the cutting die onto which the blanks fall as they pass from the outlet of the cutting die, and cutting mechanism which engages the blanks and shapes them as they pass down the inclined guide.

9. In a machine for making tooth picks, a cutting die having a passage therethrough for the passage of the blanks after they are cut, a concave way located beneath the outlet from the cutting die on which the blanks will ride as they fall from the die, a rotary cutting wheel having a cutting surface of a width equal to the length of the finished tooth pick, the transverse contour of which is curved to correspond with the lengthwise curve of the finished tooth pick and which engages and shapes the tooth pick blanks while they pass down the said concaved way.

In testimony whereof we affix our signatures, in presence of two witnesses.

WILLIS W. TAINTER.
GEORGE P. STANLEY.

Witnesses:
CHARLES P. RICKER,
GEORGE W. RICKER.